(12) United States Patent
Takei et al.

(10) Patent No.: US 7,947,394 B2
(45) Date of Patent: May 24, 2011

(54) NON-AQUEOUS ELECTROLYTE SECONDARY BATTERY-USE CATHODE MATERIAL, PRODUCTION METHOD THEREFOR, NON-AQUEOUS ELECTROLYTE SECONDARY BATTERY-USE CATHODE AND NON-AQUEOUS ELECTROLYTE SECONDARY BATTERY USING THE CATHODE MATERIAL

(75) Inventors: Kouichi Takei, Hitachi (JP); Kiyoshi Suzuki, Hitachi (JP); Tatsuya Nishida, Hitachi (JP); Hideyuki Inomata, Naruto (JP); Hiroshi Nakagawa, Tokushima-ken (JP); Katsuya Imai, Naruto (JP); Yoshihiro Shoji, Tokushima (JP); Masayuki Terasaka, Awaji (JP)

(73) Assignees: Hitachi Chemical Co., Ltd., Tokyo (JP); Sanyo Electric Co., Ltd., Osaka (JP)

( * ) Notice: Subject to any disclaimer, the term of this patent is extended or adjusted under 35 U.S.C. 154(b) by 804 days.

(21) Appl. No.: 10/570,349
(22) PCT Filed: Sep. 2, 2004
(86) PCT No.: PCT/JP2004/012726
§ 371 (c)(1),
(2), (4) Date: Mar. 3, 2006
(87) PCT Pub. No.: WO2005/024980
PCT Pub. Date: Mar. 17, 2005

(65) Prior Publication Data
US 2007/0015056 A1  Jan. 18, 2007

(30) Foreign Application Priority Data
Sep. 5, 2003 (JP) ............... P2003-314675

(51) Int. Cl.
*H01M 4/58* (2010.01)
*H01M 4/62* (2006.01)
*H01M 4/04* (2006.01)
(52) U.S. Cl. .......... 429/231.8; 429/217; 252/182.1
(58) Field of Classification Search .......... 429/231.8
See application file for complete search history.

(56) References Cited

U.S. PATENT DOCUMENTS
2001/0033822 A1* 10/2001 Ishii et al. ............. 423/448

FOREIGN PATENT DOCUMENTS
EP    0 917 228    5/1999
(Continued)

OTHER PUBLICATIONS
Chinese Official Action dated Nov. 30, 2007, for Application No. 2004800250707.
(Continued)

*Primary Examiner* — Patrick Ryan
*Assistant Examiner* — Brent Thomas
(74) *Attorney, Agent, or Firm* — Antonelli, Terry, Stout & Kraus, LLP.

(57) ABSTRACT

In order to provide a nonaqueous electrolyte secondary battery negative electrode material that has an excellent discharging capacity, the charge/discharge efficiency and the charge load characteristics, a manufacturing method thereof, a nonaqueous electrolyte secondary battery negative electrode with the negative electrode material and a nonaqueous electrolyte secondary battery, the invention provides a nonaqueous electrolyte secondary battery negative electrode material including graphite particles that have a block-like structure where a plurality of flat graphite fine particles assembles or bonds non-parallel with each other, the aspect ratio of 5 or less and a volume of fine pores in the range of 10 to $10^5$ nm in a volume of 400 to 2000 $cm^3$/kg; and a layer of carbon formed on a surface of the graphite particle, wherein a ratio (by weight ratio) of the layer of carbon to the graphite particle is in the range of 0.001 to 0.01, a manufacturing method thereof, a nonaqueous electrolyte secondary battery negative electrode with the negative electrode material and a nonaqueous electrolyte secondary battery.

8 Claims, 1 Drawing Sheet

FOREIGN PATENT DOCUMENTS

| | | | |
|---|---|---|---|
| EP | 917228 A1 | * | 5/1999 |
| JP | 62-23433 | | 5/1987 |
| JP | 05-307977 | | 11/1993 |
| JP | 10-158005 | | 6/1998 |
| JP | 10-236809 | | 9/1998 |
| JP | 2000-203818 | | 7/2000 |
| JP | 2000203818 | * | 7/2000 |
| JP | 2000203818 A | * | 7/2000 |
| JP | 2002-222650 | | 8/2002 |
| JP | 2002-373659 | | 12/2002 |
| JP | 2003-272625 | | 9/2003 |
| JP | 2004-095426 | | 3/2004 |

OTHER PUBLICATIONS

Translation of the International Preliminary Report on Patentability, for International Application No. PCT/JP2004/012726, mailed May 26, 2006.

International Search Report, for Application No. PCT/JP2004/012726, mailed Nov. 30, 2004.

Supplementary European Search Report dated Jan. 26, 2010, for Application No. EP 04 77 2680.

European Official Action dated Jun. 24, 2010, for Application No. EP 04 77 2680.

* cited by examiner

NON-AQUEOUS ELECTROLYTE SECONDARY BATTERY-USE CATHODE MATERIAL, PRODUCTION METHOD THEREFOR, NON-AQUEOUS ELECTROLYTE SECONDARY BATTERY-USE CATHODE AND NON-AQUEOUS ELECTROLYTE SECONDARY BATTERY USING THE CATHODE MATERIAL

TECHNICAL FIELD

The present invention relates to graphite particles for a nonaqueous electrolyte secondary battery negative electrode and a manufacturing method thereof, a nonaqueous electrolyte secondary battery with the obtained graphite particles and a negative electrode thereof. In more detail, the invention relates to a nonaqueous electrolyte secondary battery that has an excellent discharge load characteristics and cycle characteristics and is suitably used in portable electronic devices, electric automobiles, electricity storage or the like, a negative electrode therefor, graphite particles for the negative electrode and a manufacturing method thereof.

BACKGROUND ART

As graphite particles that are used as a negative electrode material, for instance, natural graphite particles, artificial graphite particles obtained by graphitizing cokes, artificial graphite particles obtained by graphitizing organic polymers, pitch or the like, graphite particles obtained by pulverizing these and so on can be cited. These particles are mixed with an organic binder and a solvent to form a graphite paste, followed by coating the graphite paste on a surface of a copper foil, further followed by drying the solvent, and used as a negative electrode of a lithium ion secondary battery. For instance, as shown in Japanese Patent Application Publication No. 62-23433, by use of graphite in a negative electrode, a problem of the internal short-circuiting owing to the dendrite of lithium is eliminated and thereby the cycle characteristics are improved.

However, in natural graphite particles in which graphite crystal are developed and artificial graphite particles obtained by graphitizing cokes, since a binding force between crystal layers in a c-axis direction is weaker than that in an in-plane direction in a crystal, bonds between graphite layers are disbanded owing to pulverization, resulting in so-called scaly graphite particles having large aspect ratio. Since the scaly graphite particles have large aspect ratio, when they are kneaded with a binder and coated on a current collector to prepare an electrode, the scaly graphite particles are aligned in an in-plane direction of the current collector. As a result, because of the distortion generated in a c-axis direction owing to repetition of storage and release of lithium to the graphite particles, the inside of the electrode is destroyed, resulting in not only deteriorating the cycle characteristics but also tending to deteriorate the discharge load characteristics. Furthermore, since the specific surface area of the scaly graphite particles having large aspect ratio is large, the adhesiveness with the current collector is poor; accordingly, unfavorably large amount of binder is necessary. The poor adhesiveness with the current collector causes a problem of deteriorating the current collecting property, resulting in deteriorating discharge capacity, discharge load characteristics and cycle characteristics. Still furthermore, there is a problem that the irreversible capacity at the first cycle of a lithium ion secondary battery using the scaly graphite particles having large specific surface area is large. Furthermore, the scaly graphite particles having large specific surface area exhibit a low thermal stability when lithium is stored, therefore there is a problem in the safety when it is used in a negative electrode material of a lithium ion secondary battery. Accordingly, graphite particles that allow improve in discharge load characteristics, cycle characteristics and irreversible capacity at the first cycle are in demand.

To satisfy the above demands, graphite particles where a plurality of flat particles are assembled or bonded so that a plurality of alignment surfaces may be non-parallel with each other (hereinafter referred to as non-alignment graphite particles) are proposed (for instance, Japanese Patent Application Laid-Open No. 10-158005). A lithium ion secondary battery using the non-alignment graphite particles as a negative electrode material has high discharge capacity and has excellent discharge load characteristics, the cycle characteristics and the charge/discharge efficiency at the first cycle. Accordingly, it can be preferably used in a lithium ion secondary battery. However, there is a problem that the charging capacity (charge load characteristics) when it is charged at a high-speed is low.

DISCLOSURE OF THE INVENTION

It is disclosed in Japanese Patent Application Laid-Open No. 05-307977 to coat a surface of graphite particle with low crystalline carbon. In the patent publication, an advantage of coating the low crystalline carbon on the charge load characteristics is not mentioned. However, after the study owing to the inventors, it was found that when the low crystalline carbon was coated on a surface of the non-alignment graphite particle the charge load characteristics could be improved. However, when the low crystalline carbon is simply coated on a surface of the graphite particle, the discharge capacity and the initial charge/discharge efficiency are deteriorated since the discharge capacity of the low crystalline carbon is small and the irreversible capacity at the initial discharge is large. Furthermore, since a problem that the electrode tends to be peeled after press is generated, features of the non-alignment graphite particle are lost, resulting in deteriorating the characteristics of the obtained nonaqueous electrolyte secondary battery.

The invention intends to provide a nonaqueous electrolyte secondary battery negative electrode material that can maintain the characteristics of the non-alignment graphite particles and has an excellent discharge capacity, the charge/discharge efficiency and the charge load characteristics, a manufacturing method thereof, a nonaqueous electrolyte secondary battery negative electrode with the negative electrode material and a nonaqueous electrolyte secondary battery.

Namely, the invention is characteristic in aspects described in sections below.

(1) A nonaqueous electrolyte secondary battery negative electrode material, characterized by including graphite particles that have a block-like structure where a plurality of flat graphite fine particles is assembled or bonded non-parallel with each other, the aspect ratio of 5 or less and a volume of fine pores in the range of 10 to $10^5$ nm of 400 to 2000 cm$^3$/kg, and a carbon layer formed on a surface of the graphite particle, a ratio (by weight) of the carbon layer to the graphite particle being in the range of 0.001 to 0.01.

(2) The nonaqueous electrolyte secondary battery negative electrode material of the (1), characterized in that an average particle diameter (50% D) is 10 μm or more and 50 μm or less, the aspect ratio is 1.0 or more and 3.0 or less, the true specific gravity is 2.22 or more, the bulk density is 780 kg/m$^3$ or more and 1000 kg/m$^3$ or less, the specific surface area measured by a BET method is 2.0 m²/g or more and 4.0 m²/g or less, and, in a Raman spectrum analysis with argon laser light of a wavelength of 5145 Å, an R value expressed by R=I1350/I1580 (in Raman spectrum, I1580 denotes the intensity of a peak P1 in the range of 1580 to 1620 cm$^{-1}$ and I1350 denotes the intensity of a peak P2 in the range of 1350 to 1370 cm$^{-1}$) is less than 0.2.

(3) The nonaqueous electrolyte secondary battery negative electrode material of the (1) or (2), characterized in that the viscosity of slurry measured under the conditions below is 0.5 Pa·s or more and 4.0 Pa·s or less.

1) Slurry Preparation Condition binder/(binder+negative electrode material)=0.10 (by weight ratio)

(binder+negative electrode material)/(binder+negative electrode material+solvent)=0.45 (by weight ratio)

binder: polyvinylidene fluoride (intrinsic viscosity: 1.1 dl/g) and solvent: N-methyl-2-pyrohlidone 2) Viscosity Measurement Conditions shearing speed: 4.0 sec$^{-1}$ at 25° C.

(4) The nonaqueous electrolyte secondary battery negative electrode material of any one of the (1) through (3), characterized in that the bulk density (D1) under pressure of 33 MPa is 1850 kg/m³ or more and a rate of variation of the bulk density when the pressure is released, which is represented by an equation below, is 0.3 or less.

Rate of bulk density variation when the pressure is released={D2−D3}/D2

D2: bulk density under the pressure of 97 Mpa, and
D3: bulk density when the pressure is released (5) A manufacturing method of a nonaqueous electrolyte secondary battery negative electrode material including dispersing and mixing, in a mixed solvent where a thermoplastic polymer compound is dissolved in a solvent compatible therewith, graphite particles having a block-like structure where a plurality of flat graphite fine particles assembles or bonds non-parallel with each other and the aspect ratio of 5 or less, removing the solvent to prepare graphite particles covered with the thermoplastic polymer compound, and firing the graphite particles covered with the thermoplastic polymer compound.

(6) A nonaqueous electrolyte secondary battery negative electrode, characterized by employing the negative electrode material of the (1) through (4) or the negative electrode material manufactured according to the manufacturing method of the (5)

(7) A nonaqueous electrolyte secondary battery, characterized in that the negative electrode of the (6) is used.

The negative electrode material according to the invention has an excellent discharge capacity, charge/discharge efficiency and the charge load characteristics. Accordingly, the nonaqueous electrolyte secondary battery that uses the material can be preferably used in a portable electronic device, an electric automobile, electricity storage or the like that require rapid charge.

The application is based upon and claims the benefit of priority from the prior Japanese Patent Application No. 2003-314675 (filed on Sep. 5, 2003) applied by the same applicant, and the entire contents of which are incorporated herein by reference.

BEST MODE FOR CARRYING OUT THE INVENTION

Figure 1:
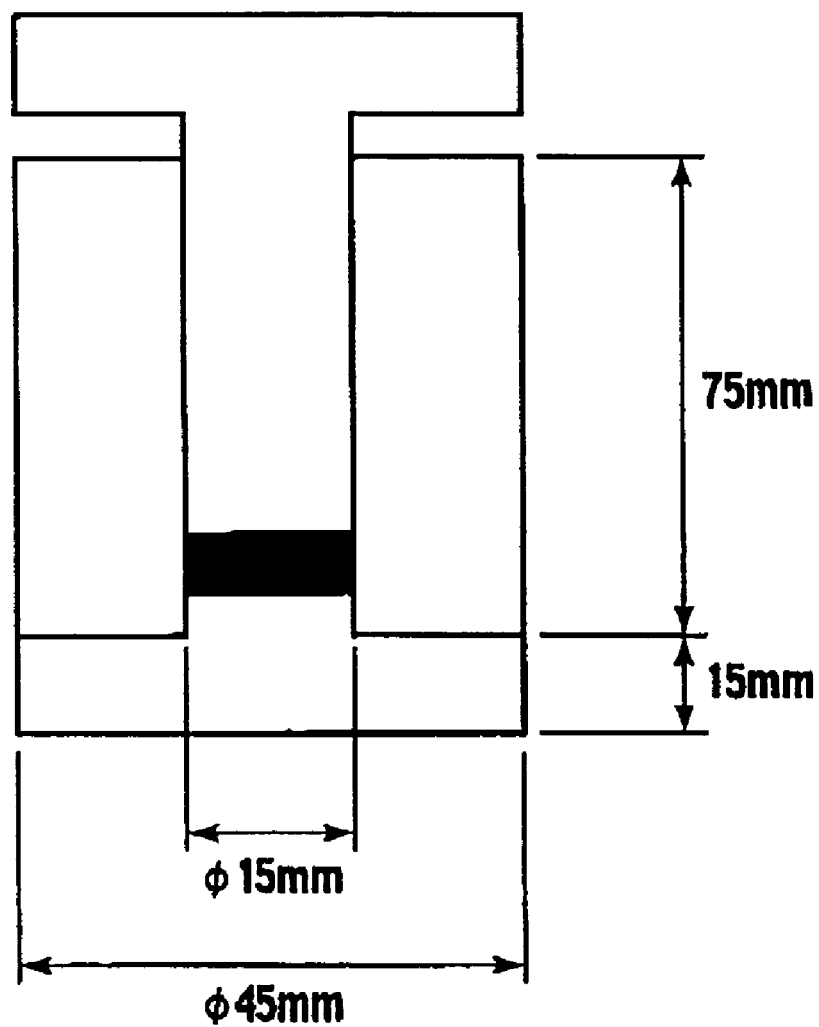
FIG. 1 is a sectional view of a metal mold that is used when the bulk density of graphite particles is measured.

A nonaqueous electrolyte secondary battery negative electrode material according to the invention is a graphite particle of which surface is covered with carbon at a ratio of the superficial carbon to the graphite particle that is a nucleus (by weight ratio) in the range of 0.001 to 0.01. When the ratio of the superficial carbon is less than 0.001, an improvement width in the charge load characteristics is small. On the other hand, when the ratio of the superficial carbon exceeds 0.01, the initial charge/discharge efficiency is deteriorated. Furthermore, as will be described below, the particle becomes hard and, when an electrode is pressed, since the spring-back due to the elastic deformation becomes large, the electrode tends to peel after pressing. The superficial carbon ratio can be calculated from a carbonization rate of a carbon precursor described below and an amount of the carbon precursor covered on the graphite particle.

As the graphite particle that may be used as a nucleus, block-like artificial graphite is preferable from a point of view of improving the characteristics of the nonaqueous electrolyte secondary battery (cycle characteristics, the discharge load characteristics and soon) that uses the obtained graphite particle, furthermore the block-like graphite particle is preferable to have a structure where a plurality of flat graphite fine particles is assembled or bonded non-parallel with each other, and still furthermore the graphite particle is more preferable to have the aspect ratio of 5 or less and pores in the range of 10 to 10⁵ nm in the range of 400 to 2000 cm³/kg. When carbon is coated on a surface of such graphite particle, more excellent cycle characteristics and discharge load characteristics as the negative electrode material can be achieved. Now, when the graphite particle of which aspect ratio is 5 or more is used, the aspect ratio of the carbon-coated graphite particle obtained by a carbon coating process according to the invention becomes large as well; as a result, the cycle characteristics and the discharge load characteristics of the nonaqueous electrolyte secondary battery are unfavorably deteriorated. The aspect ratio can be obtained by measuring from a SEM photograph of graphite particles a major axis and a minor axis of each of particles and by calculating a ratio thereof. Thus, by averaging ratios obtained from 100 particles arbitrarily selected, the aspect ratio can be determined. A volume of pores in the range of 10 to 10⁵ nm of the graphite particle used in the invention can be measured by use of a mercury penetration method. When the volume of pores in the range is less than 400 cm³/kg, the discharge load characteristics and the discharge capacity tend to decrease, on the other hand, when the volume exceeds 2000 cm³/kg, the cycle characteristics tend to deteriorate.

The graphite particle that has the structure where the plurality of flat graphite particles is aggregated or bonded non-parallel with each other, the aspect ratio of 5 or less and pores can be prepared by use of such a method as is disclosed in, for instance, Japanese Patent Application Laid-Open No. 10-158005. Namely, to a graphitizable aggregate or graphite and a graphitizable binder, a graphitizing catalyst is added, followed by mixing and firing to graphitize. As the graphitizable aggregate, various kinds of cokes such as fluid cokes, needle cokes or the like can be used. Furthermore, graphitized aggregate such as natural graphite, artificial graphite or the like may be used. As the graphitizable binder, various kinds of pitches or tars such as coal base one, petroleum base one, artificial one or the like can be used. As the graphitizing catalyst, iron, nickel, titanium, boron or the like, and carbides, oxides and nitrides thereof or the like can be used. The graphitizing catalyst is preferably added in the range of 1 to 50 parts by mass to 100 parts by mass of a total amount of the graphitizable aggregates or graphite and graphitizable binder. When the graphitizing catalyst is added less than 1 parts by mass, grains of graphite particles grow insufficiently, and in some cases the charge/discharge capacity tends to decrease. On the other hand, when it exceeds 50 parts by mass, since the uniform mixing becomes difficult, the workability tends to deteriorate. The firing is preferably carried out in an atmosphere where the mixture can not be oxidized easily. As such an atmosphere, a nitrogen atmosphere, an argon atmosphere or a vacuum atmosphere can be cited. A graphitizing temperature is preferably 2000° C. or more, more preferably 2500° C. or more and still more preferably 2800° C. or more. When the graphitizing temperature is less than 2000° C., since graphite grows poorly and the graphitizing catalyst tends to remain in prepared graphite particles, in both cases, the charge/discharge capacity tends to decrease. In the next place, the obtained graphitized matter is pulverized. A method of pulverizing the graphitized matter is not particularly restricted. However, known methods that use a jet mill, a vibration mill, a pin mill, a hammer mill or the like can be used. An average particle diameter (median diameter) after the pulverization is preferably in the range of 10 to 50 μm.

Furthermore, the nonaqueous electrolyte secondary battery negative electrode material is characterized in that an average particle diameter is 10 μm or more and 50 μm or less, the aspect ratio is 5 or less, the true specific gravity is 2.22 or more, the bulk density is 780 kg/m$^3$ or more and 1000 kg/m$^3$ or less, the specific surface area measured by a BET method is 2.0 m$^2$/g or more and 5.0 m$^2$/g or less, and, in a Raman spectrum analysis with argon laser light of a wavelength of 5145 Å, an R value expressed by R=I1350/I1580 (in Raman spectrum, I1580 denotes the intensity of a peak P1 in the range of 1580 to 1620 cm$^{-1}$ and I1350 denotes the intensity of a peak P2 in the range of 1350 to 1370 cm$^{-1}$) is less than 0.2.

The average particle diameter is measured with a laser diffraction particle site distribution analyzer as 50% D. When the average particle diameter is less than 10 μm, the specific surface area becomes larger and the initial charge/discharge efficiency tends to deteriorate. On the other hand, when the average particle diameter exceeds 50 μm, irregularities tend to be generated on a surface of an electrode, resulting in some cases in causing short-circuiting of the battery.

The aspect ratio is an average value of values that are obtained by measuring, in a SEM photograph of graphite particles, major axes and minor axes of arbitrarily extracted 100 particles and by calculating according to an equation below. When the aspect ratio exceeds 5, since particles tend to align in a direction of a current collector surface when an electrode is formed therewith, the cycle characteristics and the discharge load characteristics tend to deteriorate.

Aspect ratio=(major axis)/(minor axis)

When the true specific gravity is less than 2.22, the discharge capacity tends to decrease.

The bulk density can be measured by charging graphite particles in a vessel followed by repeatedly tapping until a volume of particles is stabilized. When a negative electrode is manufactured with graphite particles of which bulk density is less than 780 kg/m$^3$, the coating properties of the electrode deteriorate, and the initial irreversible capacity tends to increase. On the other hand, when the bulk density exceeds 1000 kg/m$^3$, an amount of coated carbon generally becomes excessive. As a result, the discharge capacity tends to decrease, the initial irreversible capacity tends to increase and the adhesiveness of the electrode tends to deteriorate.

The specific surface area is obtained by measuring an amount of absorbed nitrogen at liquid nitrogen temperature and by calculating according to the BET method. When the specific surface area is less than 2.0 m$^2$/g, an amount of coated carbon is generally excessive. As a result, the discharge capacity tends to decrease, the initial irreversible capacity tends to increase, and the adhesiveness of the electrode tends to deteriorate. On the other hand, a case where the specific surface area exceeds 5.0 m$^2$/g is found when the coated carbon is made porous for some reasons, and the initial irreversible capacity tends to unfavorably increase.

In the Raman spectrum measured with argon laser light having a wavelength of 5145 Å, a peak P1 in the range of 1580 to 1620 cm$^{-1}$ corresponds to high crystalline carbon and a peak P2 in the range of 1350 to 1370 cm$^{-1}$ corresponds to low crystalline carbon. In the invention, a ratio of the peak heights IR=P2/P1) is preferably less than 0.2. When the R-value exceeds 0.2, an amount of coated carbon is excessive. As a result, the discharge capacity tends to decrease, the initial irreversible capacity tends to increase, and the adhesiveness of the electrode tends to deteriorate.

Furthermore, the nonaqueous electrolyte secondary battery negative electrode material according to the invention is characterized in that the viscosity of the negative electrode material measured under the conditions of the shearing speed of slurry of 4 sec$^{-1}$ at 25° C. is in the range of 0.5 to 4.0 Pa·s.

Binder/(negative electrode material+binder)=0.1 (by weight ratio)

Binder: polyvinylidene fluoride, solvent: N-methyl-2-pyrolidone

Solid concentration in slurry=45% by weight

As polyvinylidene fluoride, one having intrinsic viscosity of 1.1 dl/g is used. Such polyvinylidene fluoride is available as #1120 manufactured by Kureha Chemical Industry Co., Ltd., which is a N-methyl-2-pyrrolidone solution. The slurry is prepared by kneading weighted graphite particles, polyvinylidene fluoride and N-methyl-pyrrolidone in a mortar. The viscosity of the paste is measured at 25° C. and as a measurement device for instance MODEL DV-III manufactured by Brookfield Corp. can be used. A case where the slurry viscosity measured under the above-mentioned conditions exceeds 4.0 Pa·s is found when an amount of coated carbon is scarce, resulting in insufficient improvement in the charge load characteristics. Furthermore, since an amount of solvent to obtain the viscosity suitable for the coating becomes large, a solvent cost becomes large and large energy and time become necessary in drying the electrode. On the other hand, a case where the paste viscosity measured under the above conditions becomes less than 0.5 Pa·s is found when an amount of coated carbon is excessive, and the discharge capacity tends to decrease, the initial irreversible capacity tends to increase, and the adhesiveness of the electrode tends to deteriorate.

Furthermore, the nonaqueous electrolyte secondary battery negative electrode material according to the invention is characterized in that the balk density (D1) under pressure of 33 MPa is 1850 kg/m$^3$ or more and a rate of variation of the bulk density when the pressure is released, which is represented by an equation below, is 0.3 or less.

Rate of bulk density variation when the pressure is released=$(D2-D3)/D2$

D2: bulk density under the pressure of 97 MPa

D3: bulk density when the pressure is released

The rate of bulk density variation when the pressure is released being large means that particles are elastically deformed under the pressure and upon releasing the pressure the deformation is freed. When an electrode is prepared with a negative electrode material of which bulk density under pressure of 33 MPa is less than 1850 kg/m$^3$ and the rate of variation upon releasing the pressure exceeds 0.3, there is a problem that the electrode, after pressing, tends to peel.

The bulk density is measured as follows. In a metal mold having an inner diameter of 15 mm like one shown in FIG. 1, 0.75 g of a negative electrode material sample is charged, an upper mold is inserted, and, by use of a mechanical strength tester (for instance, autograph manufactured by Shimadzu Corp.), a weight is applied on the upper mold. From a thickness (h1) of the negative electrode material sample under pressure of 33 MPa and an inner diameter of the metal mold, the bulk density D1 of the negative electrode material is calculated. Furthermore, the weight is increased to 97 MPa, a thickness (h2) of the negative electrode material sample at this time is obtained and the bulk density D2 is calculated. In the next place, a thickness (h3) of the negative electrode material sample when the weight is released is measured and the bulk density D3 is obtained. In the measurement of the thickness of each of samples, a deformation of the metal mold is measured in advance and is corrected.

A nonaqueous electrolyte secondary battery negative electrode material according to the invention can be prepared in such a manner that graphite particles that become nucleuses are dispersed and mixed in a solution where a thermoplastic polymer compound is dissolved, the solvent is removed to prepare graphite particles covered with the thermoplastic polymer compound, and the covered graphite particles are fired.

The thermoplastic polymer compound is carbonized through a liquid phase and thereby carbon having a small specific surface area is generated. Accordingly, when a surface of the graphite particle is covered therewith, the specific surface area becomes smaller to result in a negative electrode material having a small initial irreversible capacity.

As the thermoplastic polymer compound, ethylene heavy end pitch, crude oil pitch, coal tar pitch, asphalt decomposition pitch, pitch obtained by pyrolyzing polyvinyl chloride or the like, and synthetic pitch prepared by polymerizing naphthalene or the like under the presence of super-strong acid can be used. Furthermore, as the thermoplastic polymer compound, thermoplastic synthetic resins such as polyvinyl chloride, polyvinyl alcohol, polyvinyl acetate, polyvinyl butyral or the like can be used as well. In the invention, a thermoplastic polymer compound is rendered a solution so as to cover a surface of the graphite particle that becomes a nucleus. As the solvent used at this time, as far as it can dissolve the thermoplastic polymer compound, there is no particular restriction. In the case of the pitches being used, tetrahydrofuran, toluene, xylene, benzene, quinoline, pyridin or the like and furthermore mixtures (creosote oil) of liquids generated at the coal carbonization and having relatively low boiling points can be used. In the case of polyvinyl chloride being used, tetrahydrofuran, cyclohexanone, nitrobenzene or the like can be used. In the case of polyvinyl acetate, polyvinyl butyral or the like being used, alcohols, esters, ketones or the like can be used. In the case of polyvinyl alcohol being used, water can be used.

In a solution where a thermoplastic polymer compound is dissolved, graphite particles that become nucleuses are dispersed and mixed, followed by removing the solvent, and thereby graphite particles covered with the thermoplastic polymer compound are prepared. When water is used as the solvent, a surfactant can be preferably added in order to accelerate the dispersion of the graphite particles in the solution and to improve the adhesiveness between the thermoplastic resin and the graphite particles. The solvent can be removed by heating under a normal pressure or reduced pressure atmosphere. A temperature when the solvent is removed is, when the atmosphere is air, preferably 200° C. or less. When it is heated to 200° C. or more, oxygen in the atmosphere, the thermoplastic polymer compound and the solvent (in particular, when creosote oil is used) react to alter an amount of carbon generated by firing and to forward porosification, resulting in some cases in deviating from the ranges of the characteristics of the invention as the negative electrode material and in being incapable of developing desired characteristics.

In the next place, when the graphite particles covered with the thermoplastic polymer compound are fired to carbonize the thermoplastic polymer compound, graphite particles covered with carbon can be obtained. Prior to the firing, the graphite particles covered with the thermoplastic polymer compound may be heated at a temperature in the range of 150 to 300° C. When polyvinyl alcohol is used, when such heat treatment is applied, the carbonization rate can be increased. The graphite particles covered with the thermoplastic polymer compound are preferably fired in a non-oxidizing atmosphere. As such an atmosphere, an atmosphere of inert gas such as nitrogen, argon, helium or the like, a vacuum atmosphere, a circulated combustion exhaust gas atmosphere and so on can be cited. The maximum temperature at the firing is preferably set in the range of 700 to 1400° C. When it is set at 700° C. or less, the initial irreversible capacity when used as the negative electrode material becomes larger. On the other hand, when the temperature is set equal to or more than 1400° C., there is found no change in the performance as the negative electrode material, resulting in an increase in the production cost.

Thus prepared graphite particles covered with carbon are, as needs arise, pulverized, classified and sieved to obtain a nonaqueous electrolyte secondary battery negative electrode material according to the invention.

Subsequently, a nonaqueous electrolyte secondary battery negative electrode will be described. The negative electrode material is generally kneaded with an organic binder and a solvent and formed in sheet, pellet or the like. As the organic binder, ethylenic unsaturated carboxylic acid esters such as a styrene-butadiene copolymer, methyl(meth)acrylate, ethyl (meth)acrylate, butyl(meth)acrylate, (meth)acrylonitrile, hydroxyethyl(meth)acrylate and so on; ethylenic unsaturated carboxylic acids such as acrylic acid, methacrylic acid, itaconic acid, fumaric acid, maleic acid and so on; and polymer compounds having large ionic conductivity can be used. Furthermore, as a viscosity enhancer of negative electrode slurry, carboxylmethyl cellulose, methyl cellulose, hydroxymethyl cellulose, ethyl cellulose, polyvinyl alcohol, polyacrylic acid (salt), oxidized starch, phosphated starch, casein or the like can be used together with the organic binders.

As the polymer compound having large ionic conductivity, polyvinylidene fluoride, polyethylene oxide, polyepichlorohydrin, polyphosphazen, polyacrylonitrile and so on can be used. A content of the organic binder is preferably in the range of 1 to 20 parts by mass to 100 parts by mass of a mixture of the negative electrode material and the organic binder. The negative electrode material is kneaded together with the organic binder and the solvent, after the viscosity is adjusted, coated on a current collector to integrate with the current collector, and thereby a nonaqueous electrolyte secondary battery negative electrode is obtained. As the current collector, for instance, a foil or a mesh of nickel, copper or the like can be used. The integration can be applied by use of a molding method with a roll, press or the like.

Thus obtained negative electrode is disposed opposite to a positive electrode through, for instance, a separator, followed by pouring an electrolytic solution, and thereby a nonaqueous electrolyte secondary battery is obtained. As a typical example of the nonaqueous electrolyte secondary battery, a lithium secondary battery can be cited.

Thus obtained nonaqueous electrolyte secondary battery according to the invention has, in comparison with a nonaqueous electrolyte secondary battery where an existing carbon material is used in a negative electrode, an excellent rapid charge/discharge characteristics and cycle characteristics, small irreversible capacity and excellent safety.

A positive electrode material that is used in the nonaqueous electrolyte secondary battery according to the invention is not restricted to particular one. For instance, $LiNiO_2$, $LiCoO_2$, $LiMn_2O_4$, $Cr_3O_8$, $Cr_2O_5$, $V_2O_5$, $V_6O_{13}$, $VO_2$, $MnO_2$, $TiO_2$, $MoV_2O_8$, $TiS_2$, $V_2S_5$, $VS_2$, $MoS_2$, $MoS_3$, electrically conductive polymers such as polyaniline, polypyrrole and so on, porous carbon and so on can be used singularly or in combination thereof.

As the electrolytic solution, a so-called organic electrolytic solution where a lithium salt such as $LiClO_4$, $LiPF_6$, $LiAsF_6$, $LiBF_4$, $LiSO_3CF_3$ or the like is dissolved in a non-aqueous solvent of a single component or a mixture of two components or three components off or instance ethylene carbonate, propylene carbonate, butylene carbonate, vinylene carbonate, cyclopentanone, sulfolane, 3-methyl sulfolane, 2,4-dimethyl sulfolane, 3-methyl-1,3-oxazolidine-2-one, γ-butyrolactone, dimethyl carbonate, diethyl carbonate, ethyl methyl carbonate, methyl propyl carbonate, butyl methyl carbonate, ethyl propyl carbonate, butyl ethyl carbonate, dipropyl carbonate, 1,2-dimethoxyethane, tetrahydrofuran, 2-methyl tetrahydrofuran, 1,3-dioxolane, methyl acetate, ethyl acetate and so on can be used.

As the separator, non-woven fabric, cloth or microporous film mainly made of polyolefin such as polyethylene, polypropylene or the like, or combinations thereof can be used.

EXAMPLES

In what follows, the invention will be more detailed with reference to examples.
1. Preparation of Raw Material Graphite Particles
One hundred parts by mass of cokes powder having an average particle diameter of 5 μm, 40 parts by mass of tar pitch, 25 parts by mass of silicon carbide having an average particle diameter of 48 μm and 20 parts by mass of coal tar were mixed, followed by further mixing at 270° C. for 1 hr. An obtained mixture was pulverized, followed by molding under pressure into pellets, further followed by firing in nitrogen at 900° C., still further followed by graphitizing at 3000° C. by use of an Acheson furnace, followed by pulverizing by use of a hammer mill, further followed by sieving with a 200 mesh standard sieve, and thereby graphite particles were prepared. According to a scanning electron microscope (SEM) photograph of the obtained graphite particles, the graphite particles were found to have a structure where a plurality of flat particles assembled or bonded with each other non-parallel in alignment surface. Physicality values of the obtained graphite particles are shown in Table 1. Measurement methods of the respective physicality values are as follows.

(1) Average particle diameter: A particle diameter at 50% D with Laser diffraction particle distribution analyzer (SALD-3000, manufactured by Shimadzu Corp.) was taken as an average particle diameter.

(2) Aspect ratio: Major axes and minor axes of 100 particles arbitrarily extracted from a SEM photograph of the graphite particles were measured, ratios thereof were obtained according to an equation below, and an average value thereof was taken as the aspect ratio.

Aspect ratio=major axis/minor axis (3) True specific gravity: Measured according to a butanol replacement method.

(4) Bulk density: A sample of graphite particles was poured into a 200 ml glass measuring cylinder and tapped until a sample volume did not show further change, followed by measuring the sample volume. The bulk density was obtained by dividing a sample weight by the obtained sample volume.

(5) Interplanar spacing (d002): The interplanar spacing was measured by use of a wide angle X-ray diffractometer (manufactured by Phillips) with Cu—Kα line monochromatized by use of a monochrometer and with high purity silicon as a reference material.

(6) Specific surface area: A nitrogen absorption at liquid nitrogen temperature was measured according to a multipoint method with ASAP 2010 (manufactured by Maicromeritics), and the specific surface area was calculated according to the BET method.

(7) Pore volume: By use of Autoscan 33 (manufactured by Yuasa Ionics Inc.), a pore volume in the range of 10 to $10^5$ nm was measured.

(8) Peak intensity ratio in Raman spectrum: By use of NRS-2100 (manufactured by JASCO Corporation), a measurement was carried out under the conditions of laser output: 10 mW, spectrometer: F single, incident slit width: 800 μm, times of integration: two times, and exposure time; 120 sec.

(9) Slurry viscosity: Slurry with a composition below was prepared by use of a mortar, followed by measuring the viscosity by use of a MODEL DV-III manufactured by Brookfield at the shearing speed of 4 $sec^{-1}$ and 25° C.

Slurry Composition

Polyvinylidene fluoride/(polyvinylidene fluoride+ graphite particles)=0.1 (by weight ratio)

Solvent: N-methyl-2-pyrollidone
Total solid concentration (graphite particles, polyvinylidene fluoride) in paste=45%
Polyvinylidene fluoride: #1120, manufactured by Kureha Chemical Industry Co., Ltd.

TABLE 1

Table 1 Physicality Values of Raw Material Graphite Particles

| Item | Measured Value |
| --- | --- |
| Average particle diameter (μm) | 20.3 |
| Aspect ratio | 1.8 |
| True specific gravity | 2.24 |
| Bulk density (kg/m$^3$) | 750 |
| Interplanar spacing (d002) (nm) | 0.335 |
| Specific surface area (m$^2$/g) | 3.5 |
| Pore volume (cm$^3$/kg) | 860 |
| Peak intensity ratio in Raman spectrum (I1350/I1580) | 0.09 |
| Slurry viscosity (Pa · s) | 3.56 |

Examples 1 Through 4

Each of solutions obtained by dissolving 12 g (example 1), 6 g (example 2), 3.6 g (example 3) and 1.2 g (example 4) of coal tar pitch (softening point: 98° C. and carbonization rate: 50%), respectively, in tetrahydrofuran to be 900 g was poured into a flask provided with a condenser, and thereto 600 g of graphite particles shown in Table 1 was added. The solution was heated to a boiling point under agitation in a water bath, followed by mixing for 1 hr. In the next place, the solution containing the graphite particles was transferred to a rotary evaporator, followed by removing tetrahydrofuran, further followed by drying at 100° C. for 1 hr by use of a vacuum dryer, and thereby graphite particles covered with coal tar pitch were obtained. The obtained graphite particles covered with coal tar pitch were heated to 1300° C. at a temperature rise rate of 20° C./h under nitrogen stream, held there for 1 hr, and thereby graphite particles covered with carbon were obtained. The obtained graphite particles covered with carbon were pulverized by use of a cutter mill followed by passing through a 250 mesh standard sieve, and thereby a sample of negative electrode material was obtained. When the coal tar pitch was singularly heated to 1300° C. at a temperature rise rate of 20° C./hr under nitrogen stream followed by holding there for 1 hr, the carbonization rate was 49%. From the above value and amounts of coated coal tar pitch, superficial carbon ratios of the respective examples were calculated and found to be 0.01 (example 1), 0.005 (example 2), 0.003 (example 3) and 0.001 (example 4), respectively. Characteristics of obtained samples of negative electrode materials of the respective examples are shown in Table 2.

Comparative Examples 1 Through 3

As comparative example 1, the graphite particles shown in Table 1 were used as a sample of negative electrode material. Furthermore, as comparative examples 2 and 3, with 36 g and 0.6 g of coal tar pitch added respectively, similarly to example 1, samples of negative electrode material were prepared. Characteristics of obtained samples of negative electrode materials of the respective comparative examples are shown in Table 2.

TABLE 2

Characteristics of Samples of Negative Electrode Materials

| Item | Example 1 | Example 2 | Example 3 | Example 4 | Comparative example 1 | Comparative example 2 | Comparative example 3 |
|---|---|---|---|---|---|---|---|
| Superficial carbonization rate | 0.01 | 0.005 | 0.003 | 0.001 | 0 | 0.03 | 0.0005 |
| Average particle diameter ($\mu$m) | 21.3 | 21.0 | 21.0 | 20.8 | 20.3 | 21.5 | 20.3 |
| Aspect ratio | 1.8 | 1.8 | 1.8 | 1.8 | 1.8 | 1.8 | 1.8 |
| True specific gravity | 2.24 | 2.24 | 2.24 | 2.24 | 2.24 | 2.22 | 2.24 |
| Bulk density (kg/m$^3$) | 880 | 860 | 840 | 810 | 750 | 910 | 770 |
| Specific surface area (m$^2$/g) | 2.7 | 2.8 | 2.9 | 3.1 | 3.5 | 2.5 | 3.3 |
| R value | 0.17 | 0.15 | 0.14 | 0.12 | 0.09 | 0.24 | 0.11 |
| Slurry viscosity (Pa·s) | 1.20 | 1.83 | 2.20 | 2.91 | 3.56 | 0.7 | 3.4 |
| Bulk density under 33 MPa (kg/m$^3$) | 1920 | 1940 | 1960 | 1980 | 1990 | 1890 | 1990 |
| bulk density variation Rate when the pressure is released | 0.260 | 0.216 | 0.212 | 0.185 | 0.154 | 0.363 | 0.165 |

For the respective samples of negative electrode materials according to examples 1 through 4 and comparative examples 1 through 3, under the conditions shown in Table 3, evaluations as the lithium ion secondary battery negative electrode were carried out. Results are shown in Table 4.

TABLE 3

Negative Electrode Evaluation Conditions

| Item | | Condition |
|---|---|---|
| Cell | | Two electrodes (opposite electrode: lithium metal) |
| Sample weight | | 8 mg |
| Electrode area | | 2.5 cm$^2$ |
| Binder | | Polyvinylidene fluoride (#1120, manufactured by Kureha Chemical Industry Co., Ltd.) 10% by weight |
| Solvent for preparing electrode material slurry | | N-methyl-2-pyrrolidone |
| Drying condition | | 110° C., 5 hr, in air |
| Electrolytic solution | | 1 M LiPF$_6$, ethylene carbonate/methylethyl carbonate (1/1) |
| Measurement of charge/discharge capacity and charge/discharge efficiency | Charging condition | Constant current charge: 0.2 mA Constant voltage charge: 0 V (Li/Li$^+$), cut current 0.02 mA |
| | Discharging condition | Current: 0.2 mA Cut voltage: 1.5 V (Li/Li$^+$) |
| Measurement of charge load characteristics | | Measurement method 1) Two cycles of charge/discharge under charge/discharge capacity measurement conditions |

TABLE 3-continued

Negative Electrode Evaluation Conditions

| Item | Condition |
|---|---|
|  | 2) Constant current charge: 0.2 mA, 0 V (Li/Li+) cut, discharge: 0.2 mA, 1.5 V (Li/Li+) cut |
|  | 3) Constant current charge: 1.5 mA, 0 V (Li/Li+) cut, discharge: 0.2 mA, 1.5 V (Li/Li+) cut |
|  | Charge load characteristics (%) = {constant current (1.5 mA) charge capacity/constant current (0.2 mA) charge capacity} × 100. |

TABLE 4

Evaluation Results as Negative Electrode Material

| Item | Example 1 | Example 2 | Example 3 | Example 4 | Comparative example 1 | Comparative example 2 | Comparative example 3 |
|---|---|---|---|---|---|---|---|
| Superficial carbon rate | 0.01 | 0.005 | 0.003 | 0.001 | 0 | 0.03 | 0.0005 |
| 1'st time Discharging capacity (Ah/kg) | 361 | 360 | 362 | 361 | 363 | 358 | 360 |
| Charge/discharge efficiency (%) | 90.9 | 90.8 | 91.1 | 91.0 | 91.0 | 90.5 | 91.0 |
| Charge load characteristics (%) | 41 | 41 | 40 | 32 | 28 | 42 | 30 |

As obvious from Table 4, it is found that the invention (examples 1 through 4) is excellent in the discharging capacity, the charge/discharge efficiency and the charge load characteristics.

Examples 5 Through 7

In ion exchange water where 1 g of sodium dodecylbenzene sulfonate was dissolved, 154 g (example 5), 76 g (example 6) or 30 g (example 7) of polyvinyl alcohol (polymerization degree: 1700 and completely saponified type) was dissolved. The obtained mixed aqueous solution and 2000 g of graphite particles shown in Table 1 were poured in a twin-arm kneader having a heater unit, blended for 1 hr at room temperature, followed by elevating the temperature to 120° C. to evaporate and remove water, and thereby graphite particles covered with polyvinyl alcohol were obtained. The obtained graphite particles covered with polyvinyl alcohol were heated at 200° C. in air for 5 hr to make polyvinyl alcohol nonmeltable, followed by elevating a temperature to 900° C. at a temperature rise rate of 20° C./h under nitrogen stream and holding there for 1 hr, and thereby carbon covered graphite particles were obtained. The obtained carbon covered graphite particles were pulverized by use of a cutter mill and passed through a 250 mesh standard sieve to obtain a negative electrode material. When polyvinyl alcohol was singularly heated at 200° C. for 5 hr followed by heating under the same conditions (200° C. and 5 hr) as above, the carbonization rate of polyvinyl alcohol at 900° C. was 13%. Therefrom, the superficial carbon rates of samples of the negative electrode materials according to examples 5 through 7, respectively, were 0.01 (example 5), 0.005 (example 6) and 0.002 (example 7). The characteristics of the samples of negative electrode materials obtained in examples 5 through 7 are shown in Table 5.

Comparative Examples 4 and 5

Except that polyvinyl alcohol was added by 462 g (comparative example 4) and 7.7 g (comparative example 5), similarly to example 5, samples of negative electrode materials were prepared. The superficial carbon rates of the obtained samples of negative electrode materials, respectively, were 0.03 (comparative example 4) and 0.0005 (comparative example 5). The characteristics of the respective samples of negative electrode materials are shown in Table 5.

TABLE 5

Characteristics of Negative Electrode Material Samples

| Item | Example 5 | Example 6 | Example 7 | Comparative example 4 | Comparative example 5 |
|---|---|---|---|---|---|
| Superficial carbon rate | 0.01 | 0.005 | 0.002 | 0.03 | 0.0005 |
| Average particle diameter (μm) | 23.5 | 23.0 | 23.2 | 24.0 | 22.5 |
| Aspect ratio | 1.8 | 1.8 | 1.8 | 1.8 | 1.8 |
| True specific gravity | 2.24 | 2.24 | 2.24 | 2.22 | 2.24 |
| Bulk density (kg/m$^3$) | 970 | 940 | 880 | 990 | 770 |
| Specific surface area (m$^2$/g) | 2.1 | 2.3 | 3.0 | 1.8 | 3.3 |

TABLE 5-continued

Characteristics of Negative Electrode Material Samples

| Item | Example 5 | Example 6 | Example 7 | Comparative example 4 | Comparative example 5 |
|---|---|---|---|---|---|
| R value | 0.15 | 0.14 | 0.12 | 0.22 | 0.10 |
| Slurry viscosity (Pa·s) | 0.71 | 1.20 | 1.61 | 0.52 | 3.40 |
| Bulk density under 33 MPa (kg/m$^3$) | 1890 | 1870 | 1990 | 1860 | 1990 |
| Bulk density variation rate when pressure is released | 0.247 | 0.237 | 0.213 | 0.379 | 0.192 |

For the respective samples of negative electrode materials according to examples 5 through 7 and comparative examples 4 and 5, under the conditions shown in Table 3, evaluations as lithium ion secondary battery negative electrodes were carried out. Results are shown in Table 6.

TABLE 6

Evaluation Results as Negative Electrode Material

| Item | | Example 5 | Example 6 | Example 7 | Comparative example 4 | Comparative example 5 |
|---|---|---|---|---|---|---|
| Superficial carbon rate | | 0.01 | 0.005 | 0.002 | 0.03 | 0.0005 |
| 1'st time | Discharging capacity (Ah/kg) | 358 | 360 | 360 | 357 | 360 |
| | Charge/Discharge efficiency (%) | 90.5 | 90.6 | 90.4 | 89.8 | 90.4 |
| | Charge load characteristics (%) | 39 | 41 | 35 | 41 | 31 |

As obvious from Table 6, it is found that the invention (examples 5 through 7) is excellent in the discharging capacity, the charge/discharge efficiency and the charge load characteristics.

One skilled in the art will understand that what is mentioned above represents preferable embodiments according to the invention and many alterations and modifications can be applied without deviating from the spirit and the range of the invention.

The invention claimed is:

1. A nonaqueous electrolyte secondary battery negative electrode material, characterized by comprising:
   graphite particles, each having a structure where a plurality of flat graphite fine particulate assembles or bonds nonparallel with each other, each of the graphite particles having an aspect ratio of 5 or less and a volume of fine pores in the range of 10 to $10^5$ nm in a volume of 400 to 2000 cm$^3$/kg, and each of the graphite particles having a surface; and
   a layer of carbon formed on the surface of each of the graphite particles,
   wherein a ratio (by weight ratio) of the layer of carbon to a respective graphite particle is in the range of 0.003 to 0.01, and
   wherein an average particle diameter (50% D) is 10 μm or more and 50 μm or less, the true specific gravity is 2.22 or more, the bulk density is 780 kg/m$^3$ or more and 1000 kg/m$^3$ or less, the specific surface area measured by a BET method is 2.0 m$^2$/g or more and 5.0 m$^2$/g or less, and, in a Raman spectrum analysis with argon laser light of a wavelength of 5145 Å, an R value expressed by R=I1350/I1580 (in Raman spectrum, I1580 denotes an intensity of a peak P1 in the range of 1580 to 1620 cm$^{-1}$ and I1350 denotes an intensity of a peak P2 in the range of 1350 to 1370 cm4) is less than 0.2.

2. The nonaqueous electrolyte secondary battery negative electrode material of claim 1, characterized in that the viscosity of slurry measured under the conditions below is 0.5 Pa·s or more and 4.0 Pa·s or less;
   1) Slurry Preparation Conditions binder/(binder+negative electrode material)=0.10 (by weight ratio)

(binder+negative electrode material)/(binder+negative electrode material+solvent)=0.45 (by weight ratio)

binder: polyvinylidene fluoride (intrinsic viscosity: 1.1 dl/g) and
   solvent: N-methyl-2-pyrohlidone
   2) Viscosity Measurement Conditions
   shearing speed: 4.0 sec$^{-1}$ at 25° C.

3. The nonaqueous electrolyte secondary battery negative electrode material of claim 1, characterized in that the bulk density (D1) under pressure of 33 MPa is 1850 kg/m$^3$ or more and a rate of variation of the bulk density when the pressure is released, which is represented by an equation below, is 0.3 or less;

Rate of variation of the bulk density when the pressure is released={D2−D3}/D2

D2: bulk density under the pressure of 97 MPa, and
D3: bulk density when the pressure is released.

4. A nonaqueous electrolyte secondary battery negative electrode, which includes the negative electrode material of claim 1.

5. A nonaqueous electrolyte secondary battery, having, as the negative electrode thereof, the nonaqueous electrolyte secondary battery negative electrode of claim 4.

6. The nonaqueous electrolyte secondary battery negative electrode material of claim 1, wherein said layer consists essentially of carbon.

7. The nonaqueous electrolyte secondary battery negative electrode material of claim 1, wherein said layer consists of carbon.

8. The nonaqueous electrolyte secondary battery negative electrode material of claim 1, wherein the layer of carbon covers the respective graphite particle.

* * * * *